(12) United States Patent
Miyamoto et al.

(10) Patent No.: US 10,239,517 B2
(45) Date of Patent: *Mar. 26, 2019

(54) CONTROLLER OF HYBRID VEHICLE (71) Applicant: MITSUBISHI JIDOSHA KOGYO KABUSHIKI KAISHA, Tokyo (JP)

(72) Inventors: Naoki Miyamoto, Tokyo (JP); Norihiko Ikoma, Tokyo (JP); Makoto Kamachi, Tokyo (JP); Ryo Shimizu, Tokyo (JP); Hironori Abe, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 15/462,455

(22) Filed: Mar. 17, 2017

(65) Prior Publication Data

US 2017/0282905 A1 Oct. 5, 2017

(30) Foreign Application Priority Data

Mar. 30, 2016 (JP) ................................ 2016-068410

(51) Int. Cl.
*B60W 20/40* (2016.01)
*H02P 29/68* (2016.01)
(Continued)

(52) U.S. Cl.
CPC ............. *B60W 20/40* (2013.01); *B60L 1/003* (2013.01); *B60L 3/00* (2013.01); *B60L 3/003* (2013.01);
(Continued)

(58) Field of Classification Search
CPC .................................................... B60W 20/40
See application file for complete search history.

(56) References Cited

U.S. PATENT DOCUMENTS 8,284,575 B2 * 10/2012 Inamura .................. H02M 1/08
318/800
8,594,872 B2 * 11/2013 Ichimoto ............... B60W 20/00
701/22
(Continued)

FOREIGN PATENT DOCUMENTS

EP        2 517 938 A1     10/2012
JP      2001-103607 A       4/2001
(Continued)

OTHER PUBLICATIONS

European Search Report completed Jul. 11, 2017 in EP Application No. 17 16 3701.

*Primary Examiner* — Hussein Elchanti
*Assistant Examiner* — Michael A Berns
(74) *Attorney, Agent, or Firm* — Birch, Stewart, Kolasch & Birch, LLP (57) ABSTRACT

A controller of a hybrid vehicle includes: a control unit configured to activate a starter device for starting any one of a drive motor and an engine by stepping up electric power from a battery by a voltage transformer. The control unit includes a limitation part that limits passing power of the voltage transformer when the temperature of the voltage transformer rises, and a calculation part that obtains a maximum electric power that can be supplied to the drive motor when the starter device is activated, by subtracting a consumed power of the starter device from limited power during limitation of passing power by the limitation part. The control unit activates the starter device and starts the engine, when required power of the drive motor reaches the maximum electric power calculated by the calculation part during limitation of passing power by the limitation part.

5 Claims, 4 Drawing Sheets (51) Int. Cl.
  *B60L 3/00* (2019.01)
  *B60L 11/18* (2006.01)
  *B60L 1/00* (2006.01)
  *B60L 9/16* (2006.01)
  *B60L 11/08* (2006.01)
  *B60L 11/12* (2006.01)

(52) U.S. Cl.
  CPC .......... *B60L 3/0046* (2013.01); *B60L 3/0061* (2013.01); *B60L 9/16* (2013.01); *B60L 11/08* (2013.01); *B60L 11/12* (2013.01); *B60L 11/18* (2013.01); *B60L 11/1803* (2013.01); *B60L 11/1805* (2013.01); *H02P 29/68* (2016.02); *B60L 2210/14* (2013.01); *B60L 2240/525* (2013.01); *B60L 2240/547* (2013.01); *B60L 2260/165* (2013.01); *B60L 2260/26* (2013.01); *B60W 2510/085* (2013.01); *B60W 2510/244* (2013.01); *B60Y 2200/92* (2013.01); *B60Y 2400/112* (2013.01); *Y02T 10/7005* (2013.01); *Y02T 10/7077* (2013.01); *Y02T 10/7225* (2013.01); *Y10S 903/93* (2013.01)

(56) References Cited

U.S. PATENT DOCUMENTS

| | | | | |
|---|---|---|---|---|
| 9,088,178 B2 * | 7/2015 | Adest | .................... | H02J 1/102 |
| 9,520,741 B2 * | 12/2016 | Kanakasabai | ........... | B60L 1/003 |
| 9,688,154 B2 * | 6/2017 | Nakamura | ........... | B60L 11/1803 |
| 9,728,488 B2 * | 8/2017 | Kusaka | ................. | H01L 23/473 |
| 9,970,809 B2 * | 5/2018 | Ito | ........................ | G01G 23/01 |
| 2008/0143188 A1 * | 6/2008 | Adest | ...................... | H02J 1/102 307/82 |
| 2009/0173555 A1 | 7/2009 | Okamura | | |
| 2011/0012542 A1 * | 1/2011 | Inamura | ................... | H02M 1/08 318/139 |
| 2012/0130577 A1 * | 5/2012 | Ichimoto | ............... | B60W 20/00 701/22 |
| 2015/0251543 A1 * | 9/2015 | Kaihara | ................... | B60L 11/08 307/10.1 |
| 2015/0321573 A1 * | 11/2015 | Sato | ...................... | H02P 27/085 701/22 |
| 2016/0114788 A1 * | 4/2016 | Kamatani | ............. | B60K 6/445 701/22 |
| 2016/0254212 A1 * | 9/2016 | Kusaka | ................... | H01L 23/34 361/699 |
| 2017/0282894 A1 * | 10/2017 | Kamachi | ............... | B60W 20/13 |
| 2017/0282905 A1 * | 10/2017 | Miyamoto | ............ | B60W 20/40 |

FOREIGN PATENT DOCUMENTS

| | | |
|---|---|---|
| JP | 2007-161101 A | 6/2007 |
| JP | 2007-325352 A | 12/2007 |
| JP | 2009-248732 A | 10/2009 |
| JP | 2014-121961 A | 7/2014 |

* cited by examiner

CONTROLLER OF HYBRID VEHICLE

BACKGROUND OF THE INVENTION

Field of the Invention

The present invention relates to a controller of a hybrid vehicle, and specifically to a controller of a hybrid vehicle equipped with a voltage transformer (boost converter) that steps up electric power of a drive battery, and supplies it to a drive motor.

Description of the Related Art

For example, a hybrid vehicle whose drive mode is switchable between EV mode and parallel mode is constructed with a drive motor connected to a drive wheel and an engine also connected to the drive wheel through a clutch. In EV mode, the vehicle travels by disconnecting the clutch to drive the drive motor by power supply from the drive battery. When the total required output for travel is increased by pressing of an accelerator, for example, and cannot be achieved by the drive motor alone, the drive mode is switched to parallel mode. In parallel mode, the clutch is connected after the engine is started by a starter device such that driving force of the engine is transmitted to the drive wheel in addition to the driving force of the drive motor, to achieve travel corresponding to the operation of the accelerator.

Incidentally, as described in Japanese Patent Laid-Open No. 2007-325352 (Patent Document 1), for example, in hybrid vehicles brought into actual use in recent years, electric power of a drive battery is not only converted from DC to AC by an inverter, but is also stepped up by a boost converter to improve efficiency of a drive motor, an inverter, and the like.

However, the hybrid vehicle described in Patent Document 1 suffers from a problem such that a power limit, which is imposed to prevent the boost converter from being heated, temporarily reduces the driving force of the drive wheel when switching from EV mode to parallel mode.

For example, an increase in electric power stepped up or stepped down through the boost converter (hereinafter referred to as passing power), or operation and the like in high temperature environment increases the temperature of the boost converter and may cause malfunction due to overheating. Hence, to protect parts, a countermeasure is taken to limit passing power in a certain high temperature range.

As mentioned above, the switching from EV mode to parallel mode is performed when the total required output is increased by pressing of the accelerator or the like, and cannot be achieved by the drive motor alone. Hence, at this time, the required power of the drive motor often exceeds the limited power of the boost converter. When the electric power to the drive motor is limited to the limited power, the entire passing power of the boost converter is supplied to the drive motor.

However, when switching from EV mode to parallel mode is performed during power limitation of the boost converter, the starter device is activated to start the engine. Since power supply to the drive motor is reduced by the power consumption amount of the starter device, the driving force transmitted to the drive wheel is also reduced. Although the driving force recovers when the starter device stops after completion of startup of the engine, even a temporary reduction of the driving force causes acceleration failure or pitching, for example, which leads to deterioration in drivability.

For example, in the case of a hybrid vehicle in which a drive wheel (e.g., rear wheel) other than the drive wheel (e.g., front wheel) driven by the drive motor is driven by another drive motor that directly receives electric power from a drive battery (i.e., unaffected by power limit), it is possible to prevent reduction of driving force of the vehicle as a whole, by temporarily increasing the driving force of this drive motor in synchronization with the activation of the starter device. However, this is hardly a practical measure, since a change in driving force that occurs momentarily between the front wheel and the rear wheel may disturb the behavior of the vehicle.

An objective of the present invention is to provide a controller of a hybrid vehicle that can prevent a temporary reduction of driving force due to activation of a starter device for starting an engine when the drive mode is switched from EV mode to parallel mode during power limitation of a boost converter, and can thereby ensure satisfactory drivability of the vehicle.

SUMMARY OF THE INVENTION

To achieve the above objective, a controller of a hybrid vehicle of the present invention includes: a control unit configured to activate a starter device for starting any one of a drive motor and an engine by stepping up electric power from a battery by a voltage transformer, wherein: the control unit includes a limitation part that limits passing power of the voltage transformer when the temperature of the voltage transformer rises, and a calculation part that obtains a maximum electric power that can be supplied to the drive motor when the starter device is activated, by subtracting a consumed power of the starter device from limited power during limitation of passing power by the limitation part; and the control unit activates the starter device and starts the engine, when required power of the drive motor reaches the maximum electric power calculated by the calculation part during limitation of passing power by the limitation part.

According to the controller of a hybrid vehicle configured in this manner, the control unit activates the starter device to start the engine, when required power of the drive motor reaches the maximum electric power during limitation of passing power by the limitation part. The passing power of the voltage transformer at this point is still allowed to increase by the amount of the consumed power of the starter device before reaching the limited power of the limitation part. Even if the power consumed by activation of the starter device is added to the required power of the drive motor, electric power supplied to the drive motor is not reduced, and is maintained at the required power level. Hence, it is possible to prevent acceleration failure or pitching, for example, caused by a temporary reduction of driving force, and satisfactory drivability can be ensured.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Hereinafter, a description will be given of an embodiment in which the present invention is embodied as a controller of a plug-in hybrid vehicle (hereinafter referred to as vehicle 1).

Figure 1:
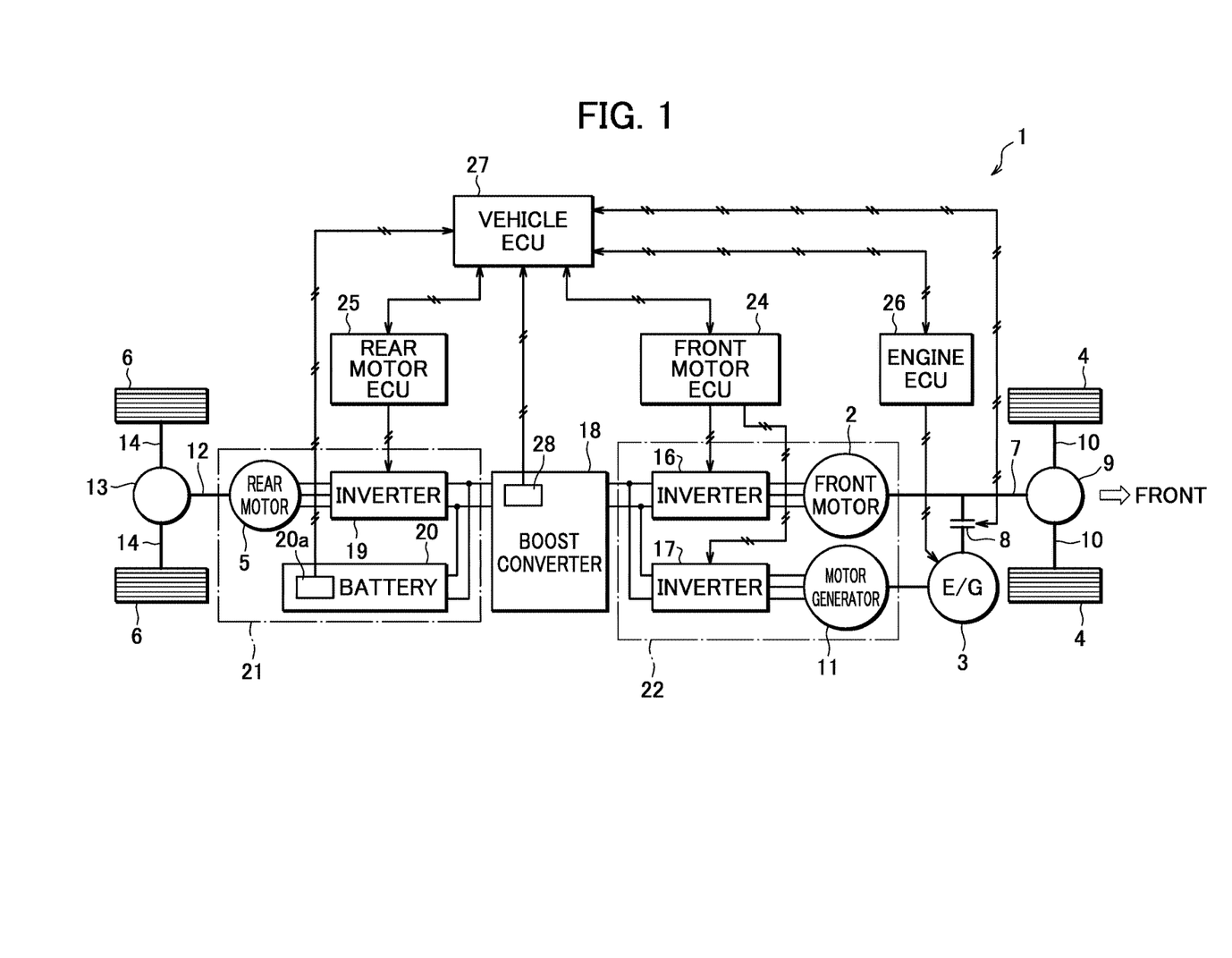
FIG. 1 is an overall configuration diagram of a plug-in hybrid vehicle to which a controller of an embodiment is applied.

FIG. 1 is an overall configuration diagram of the plug-in hybrid vehicle to which the controller of the embodiment is applied.

The vehicle 1 of the embodiment is a four-wheel drive vehicle configured to drive front wheels 4 by an output of a front motor 2 (drive motor) or outputs of the front motor 2 and an engine 3, and drive rear wheels 6 by an output of a rear motor 5.

An output shaft of the front motor 2 is connected to a drive shaft 7 of the front wheels 4, and the engine 3 is also connected to the drive shaft 7 through a clutch 8. Moreover, the front wheels 4 are connected to the drive shaft 7 through a front differential 9 and right and left drive shafts 10. Driving force of the front motor 2 and driving force of the engine 3 when the clutch 8 is connected are transmitted to the front wheels 4 through the drive shaft 7, the front differential 9, and the right and left drive shafts 10, to generate driving force for the vehicle to run, in the front wheels 4. A motor generator (starter device) 11 is connected to an output shaft of the engine 3. The motor generator 11 can arbitrarily generate electric power by being driven by the engine 3 regardless of whether or not the clutch 8 is connected, and also functions as a starter for starting the engine 3 from a stopped state when the clutch 8 is disconnected.

Meanwhile, an output shaft of the rear motor 5 is connected to a drive shaft 12 of the rear wheels 6, and the rear wheels 6 are connected to the drive shaft 12 through a rear differential 13 and right and left drive shafts 14. Driving force of the rear motor 5 is transmitted to the rear wheels 6 through the drive shaft 12, the rear differential 13, and the right and left drive shafts 14, and generates driving force for the vehicle to run, in the rear wheels 6.

Inverters 16, 17 are connected to the front motor 2 and the motor generator 11, respectively, and the inverters 16, 17 are connected to a boost converter (voltage transformer) 18. An inverter 19 is connected to the rear motor 5, and the inverter 19 and a drive battery 20 are connected to the boost converter 18. The drive battery 20 is formed of a secondary battery such as a lithium ion battery, and includes a battery monitoring unit 20a that calculates its SOC (state of charge), and detects its temperature $T_{BAT}$.

The operating voltage differs between rear and front sides of the boost converter 18. The rear motor 5 and the inverter 19 are designed to operate at a voltage (e.g., 300V) of the drive battery 20 and form a low voltage circuit 21 with the drive battery 20, while the front motor 2, the motor generator 11, and their inverters 16, 17 are designed to operate at a higher voltage (e.g., 600V) to improve efficiency, and form a high voltage circuit 22.

The boost converter 18 has a function of stepping up and down the voltage when electric power is exchanged between the circuits 21, 22. For example, the boost converter 18 steps up the low voltage-side DC power discharged from the drive battery 20 and supplies it to the inverter 16, so that the three-phase AC power converted by the inverter 16 drives the front motor 2, and the three-phase AC power similarly converted by the inverter 17 causes the motor generator 11 to function as a starter. Additionally, the three-phase AC power generated by the motor generator 11 is converted into high voltage-side DC power by the inverter 17, and the boost converter 18 steps down the DC power to charge the drive battery 20. The DC power stepped down by the boost converter 18 is also converted into three-phase AC power by the inverter 19, and is supplied to drive the rear motor 5.

Note that electric power is exchanged in each of the circuits 21, 22 without passing through the boost converter 18. For example, on the low voltage circuit 21 side, DC power discharged from the drive battery 20 is converted into three-phase AC power by the inverter 19 and supplied to the rear motor 5. Conversely, three-phase AC power regenerated by the rear motor 5 is converted into DC power by the inverter 19, and is used to charge the drive battery 20. In addition, three-phase AC power generated by the motor generator 11 on the high voltage circuit 22 side is converted into DC power by the inverter 17, and is then converted back into three-phase AC power by the inverter 16 to be supplied to the front motor 2.

A front motor ECU 24 is connected to each of the inverters 16, 17 on the high voltage circuit 22 side, and the front motor ECU 24 switches the inverters 16, 17 to control the above-mentioned operation of the front motor 2 and the motor generator 11. Meanwhile, a rear motor ECU 25 is connected to the inverter 19 on the low voltage circuit 21 side, and the rear motor ECU 25 switches the inverter 19 to control the above-mentioned operation of the rear motor 5.

An engine ECU 26 is connected to the engine 3, and the engine ECU 26 controls the throttle position, fuel injection amount, ignition timing, and the like of the engine 3, to operate the engine 3.

Note that although not shown in FIG. 1, the drive battery 20 includes a charger, and the charger can be used to arbitrarily charge the drive battery 20 with electric power supplied from an external power source.

The front motor ECU 24, rear motor ECU 25, and engine ECU 26 described above are connected to a vehicle ECU 27 which is a higher-level unit. Each of The ECUs 24 to 27 includes an input/output device, a storage device (e.g., ROM, RAM, or nonvolatile RAM), a central processing unit (CPU), and the like. Note that the nonvolatile RAM of each storage device stores instructions for various later-mentioned control performed by each CPU.

The vehicle ECU 27 is a control unit for performing general control of the vehicle 1, and lower-level ECUs 24 to 26 having received instructions from the vehicle ECU 27 control the aforementioned operation of the front motor 2, motor generator 11, rear motor 5, and engine 3. Hence, the battery monitoring unit 20a of the drive battery 20, a temperature sensor 28 for detecting a temperature $T_{cvtr}$ of the boost converter 18, and unillustrated sensors such as an accelerator pedal position sensor for detecting the accelerator pedal position and a speed sensor for detecting a vehicle speed V are connected to the input side of the vehicle ECU 27. Additionally, operation states of the front motor 2, motor generator 11, rear motor 5, and engine 3 are input to the input side of the vehicle ECU 27 through the ECUs 24 to 26.

In addition to the aforementioned front motor ECU 24, rear motor ECU 25, and engine ECU 26, the clutch 8 and boost converter 18 are connected to the output side of the vehicle ECU 27.

The vehicle ECU 27 switches the drive mode of the vehicle 1 among EV mode, series mode and parallel mode, on the basis of the aforementioned various detection amounts and operation information of the accelerator pedal position sensor and the like. For example, the drive mode is set to parallel mode in ranges such as a high speed range where efficiency of the engine 3 is high. In medium to low speed ranges, the drive mode is switched between EV mode and series mode depending on the SOC and the like of the drive battery 20.

In EV mode, the clutch 8 is disconnected and the engine 3 is stopped, so that electric power from the drive battery 20 drives the front wheels 4 through the front motor 2, and drives the rear wheels 6 through the rear motor 5 to drive the vehicle 1. In series mode, the clutch 8 is disconnected to separate the engine 3 from the front wheels 4 side, and the engine 3 is operated to drive the motor generator 11. The generated electric power drives the front wheels 4 through the front motor 2 and drives the rear wheels 6 through the rear motor 5 to drive the vehicle 1, and also charges the drive battery 20 with surplus power.

In parallel mode, the engine 3 is operated after connecting the clutch 8, to transmit driving force to the front wheels 4. When the engine driving force is insufficient, battery power is used to drive the front motor 2 and the rear motor 5. In addition, when the SOC of the drive battery 20 is low and charging is required, the engine 3 drives the motor generator 11, and the generated electric power is used to charge the drive battery 20.

When electric power is thus exchanged between the high and low voltage circuits 21, 22, the boost converter 18 steps up and down the voltage in the aforementioned manner, as a matter of course.

Additionally, the vehicle ECU 27 calculates a total required output for travel of the vehicle 1, on the basis of the aforementioned various detection amounts and operation information. The vehicle ECU 27 distributes the total required output to the front motor 2 side and the rear motor 5 side in EV mode and series mode, and to the front motor 2 side, the engine 3 side, and the rear motor 5 side in parallel mode. Then, the vehicle ECU 27 sets a required torque for each of the front motor 2, the rear motor 5, and the engine 3 on the basis of the distributed required output and the like, and outputs an instruction signal to the front motor ECU 24, rear motor ECU 25, and engine ECU 26, so that the respective required torques can be achieved.

According to the instruction signal from the vehicle ECU 27, the front motor ECU 24 and the rear motor ECU 25 calculate a target current value to apply to a coil of each phase of the front motor 2 and the rear motor 5 to achieve the required torque. Thereafter, the front motor ECU 24 and the rear motor ECU 25 switch the respective inverters 16, 19 according to the target current values, and achieve the required torque. Note that a similar operation is performed when the motor generator 11 generates electric power. Here, the front motor ECU 24 switches the inverter 17 according to the target current value calculated from the required torque on the negative side, and achieves the required torque.

According to the instruction signal from the vehicle ECU 27, the engine ECU 26 calculates target values of the throttle position, fuel injection amount, ignition timing and the like for achieving the required torque, and controls operation of the engine 3 on the basis of the target values to achieve the required torque.

Meanwhile, the vehicle ECU 27 controls the boost converter 18 to step up and down the voltage of electric power exchanged between the low and high voltage circuits 21, 22. Although stepping up and down the voltage improves efficiency of the front motor 2 and the motor generator 11 as well as their inverters 16, 17, for example, the boost converter 18 consumes power with its operation. For this reason, the boost converter 18 is activated in a high speed-heavy load range of the front motor 2 or the motor generator 11 where particularly high efficiency can be achieved, and the boost converter 18 is stopped in other operation ranges.

Also, since an increase in passing power of the boost converter 18 or operation and the like in high temperature environment increases the temperature of the boost converter 18 and may cause malfunction, the vehicle ECU 27 limits passing power (limitation part) according to the temperature of the boost converter 18.

Figure 2:
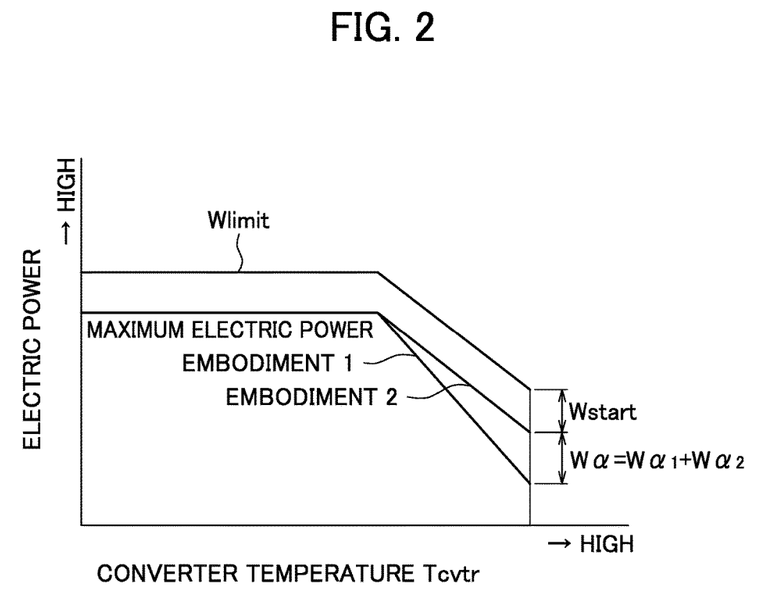
FIG. 2 is a characteristics diagram showing how a power limit value $W_{limit}$ of a boost converter and the maximum electric power of a front motor are set.

FIG. 2 is a characteristics diagram showing how a power limit value $W_{limit}$ of the boost converter 18 and the maximum electric power of the front motor 2 are set.

As indicated by a thin solid line in FIG. 2, the vehicle ECU 27 calculates the power limit value $W_{limit}$ (hereinafter referred to as power limit value) of passing power on the basis of the temperature $T_{cvtr}$ of the boost converter 18 detected by the temperature sensor 28, and causes the boost converter 18 to step up and down the voltage by using the power limit value $W_{limit}$ as an upper limit. Hereinafter, for convenience of the description, passing power limited according to the power limit value $W_{limit}$ is referred to as limited power.

As can be seen from FIG. 2, the power limit value $W_{limit}$ is set to a constant value in a temperature range of a certain temperature or lower. In a higher temperature range, temperature rise is suppressed by setting a lower power limit value $W_{limit}$ for a higher temperature $T_{cvtr}$. However, as has been mentioned in Description of the Related Art, there is a problem that when the drive mode is switched from EV mode to parallel mode during power limitation of the boost converter 18, the driving force of the front wheels 4 is temporarily reduced, whereby drivability is deteriorated.

This situation will be described below. When the driving mode is switched to parallel mode after an increase in the total required output due to pressing of the accelerator or the like during travel in EV mode, first, the engine 3 is started by the motor generator 11, and then the clutch 8 is connected to transmit, in addition to the driving force of the front motor 2, the driving force of the engine 3 to the front wheels 4. Then, if electric power to the front motor 2 is limited by the boost converter 18 immediately before start of the engine, part of passing power of the boost converter 18 (i.e., power supply to the front motor 2) is consumed to activate the motor generator 11. Hence, power supply to the front motor 2 is reduced by this consumption amount. For this reason, the driving force of the front wheels 4 is reduced until the motor generator 11 stops after completion of engine startup. This deteriorates drivability.

In view of the above problem, the inventors of the present invention focused on the following points. The switching to parallel mode at this time is performed when the required power of the front motor 2 exceeds the limited power of the boost converter 18. However, if the switching to parallel mode is performed before the required power exceeds the limited power, the required power of the front motor 2 can be ensured even if part of the limited power is consumed to activate the motor generator 11.

Additionally, since reduction of power supply to the front motor 2 is caused by activation of the motor generator 11, by switching to parallel mode at a timing hastened by the power consumption amount, that is, at a timing when the required power of the front motor 2 reaches a value (maximum electric power to be described below) obtained by subtracting the power consumption amount of the motor generator 11 from the limited power of the boost converter 18, the switching to parallel mode can be done while ensuring the required power of the front motor 2. According to this observation, drive mode switching control from EV mode to parallel mode performed by the vehicle ECU 27 will be described below as first and second embodiments.

First Embodiment

In the first embodiment, the maximum electric power is calculated according to the following expression (1) (calculation part).

$$\text{Maximum electric power} = W_{limit} - W_{start} \qquad (1)$$

As shown in FIG. 2, the maximum electric power is set as a value obtained by subtracting a consumed power $W_{start}$ of the motor generator 11 from the power limit value $W_{limit}$, over the entire temperature range of the boost converter 18. Hence, the maximum electric power refers to the maximum electric power that can be supplied to the front motor 2 when the motor generator 11 is activated for engine startup, during limitation of passing power of the boost converter 18.

Accordingly, when the total required output necessary for the vehicle 1 to run increases by pressing of the accelerator or the like during travel in EV mode, and the required power (required output) of the front motor 2 also increases, switching to parallel mode is performed when the required power reaches the maximum electric power.

Figure 3:
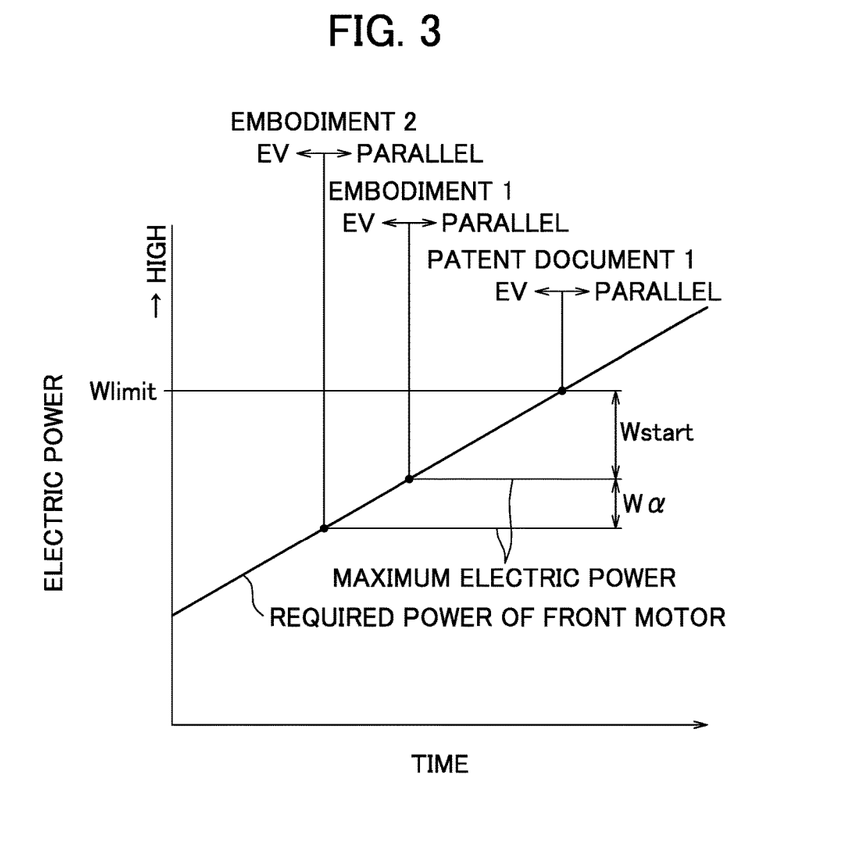
FIG. 3 is a time chart showing the switch timing to parallel mode when the required power of the front motor increases.

FIG. 3 is a time chart showing the switch timing to parallel mode when the required power of the front motor 2 increases. As shown in FIG. 3, in the technique of Japanese Patent Laid-Open No. 2007-325352, switching from EV mode to parallel mode is performed when the required power of the front motor reaches the power limit value Wlimit. Meanwhile, in the first embodiment, switching to parallel mode is performed at a timing hastened by the consumed power $W_{start}$ of the motor generator 11.

Hence, the passing power of the boost converter 18 at this point is still allowed to increase by the amount of the consumed power $W_{start}$ before reaching the power limit value $W_{limit}$. Even if the consumed power $W_{start}$ from activation of the motor generator 11 is added to the required power of the front motor 2, electric power supplied to the front motor 2 is not reduced, and is maintained at the required power level. Thus, it is possible to prevent acceleration failure or pitching, for example, caused by a temporary reduction of the driving force of the front wheels 4, and satisfactory drivability of the vehicle can be ensured.

Additionally, as shown in FIG. 2, electric power supplied to the front motor 2 is limited to the maximum electric power lower than the power limit value $W_{limit}$ of the boost converter 18. However, since the driving force of the engine 3 is added by switching to parallel mode when the required power reaches the maximum electric power, transition of the driving force of the front wheels 4 in the course of switching from EV mode to parallel mode is smooth and no different from the technique of Japanese Patent Laid-Open No. 2007-325352, for example. In this regard, too, satisfactory drivability can be ensured.

Moreover, since limitation of passing power according to the maximum electric power reduces thermal load on the boost converter 18 in EV mode, the temperature of the boost converter 18 is lowered. For this reason, the power limit value $W_{limit}$ set on the basis of the temperature $T_{cvtr}$ increases promptly. This also achieves an advantage that limitation imposed on power supply to the front motor 2 can be cancelled promptly.

Second Embodiment

In the second embodiment, the maximum electric power is calculated according to the following expression (2) (calculation part).

$$\text{Maximum electric power} = W_{limit} - W_{start} - W\alpha \qquad (2)$$

Here, $W\alpha$ is an allowance amount, and is calculated according to the following expression (3).

$$W\alpha = W\alpha 1 + W\alpha 2 \qquad (3)$$

Here, $W\alpha 1$ is a temperature correlation amount, and $W\alpha 2$ is an SOC correlation amount.

Figure 4:
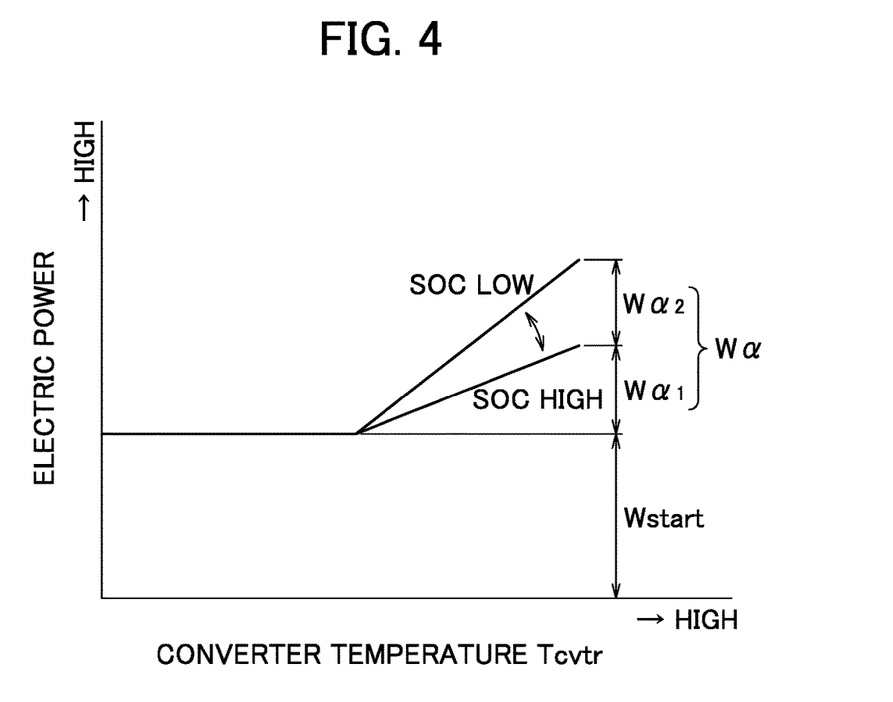
FIG. 4 is a characteristics diagram showing a relation among a consumed power $W_{start}$, an allowance amount $W\alpha$, a temperature correlation amount $W\alpha 1$, and an SOC correlation amount $W\alpha 2$.

FIG. 4 is a characteristics diagram showing a relation among the consumed power $W_{start}$, the allowance amount $W\alpha$, the temperature correlation amount $W\alpha 1$, and the SOC correlation amount $W\alpha 2$.

As shown in FIG. 4, while the consumed power $W_{start}$ of the motor generator 11 is constant regardless of the temperature Tcvtr of the boost converter 18, the temperature correlation amount $W\alpha 1$ is set to 0 in a temperature range of a certain temperature or lower, and, in a higher temperature range, is set larger for a higher temperature $T_{cvtr}$. Similarly, the SOC correlation amount $W\alpha 2$ is set to 0 in a temperature range of a certain temperature or lower, and, in a higher temperature range, is set larger for a higher temperature $T_{cvtr}$. Here, the inclination of the SOC correlation amount relative to the temperature $T_{cvtr}$ is steeper, that is, set larger, for a lower SOC (remaining battery level) of the drive battery 20.

Note that the characteristics set in FIG. 4 are an example, and can be changed arbitrarily as long as they vary the temperature correlation amount $W\alpha 1$ and the SOC correlation amount $W\alpha 2$ in the above-mentioned direction according to variation in the temperature $T_{cvtr}$ of the boost converter 18.

As a result, the allowance amount $W\alpha$ is set to a larger value for a higher temperature $T_{cvtr}$ of the boost converter 18, and a lower SOC of the drive battery 20, in a temperature range of a certain temperature or higher. As shown in FIG. 2, since the allowance amount $W\alpha$ is subtracted from the power limit value $W_{limit}$, the maximum electric power is set even lower than the first embodiment.

The reason of reflecting the temperature $T_{cvtr}$ and the SOC on the maximum electric power is because these are requirements that affect thermal load on the boost converter 18. That is, the temperature $T_{cvtr}$ directly affects thermal load on the boost converter 18, and the higher the temperature $T_{cvtr}$, the greater the necessity to reduce the passing power of the boost converter 18. Also, the lower the SOC of the drive battery, the larger the loss when the boost converter 18 steps up and down the passing power, and a larger loss is more likely to raise the temperature of the boost converter 18. Accordingly, the SOC can be regarded as a requirement that indirectly affects thermal load on the boost converter 18, and the lower the SOC, the greater the necessity to reduce the passing power of the boost converter 18.

Since the maximum electric power is set in this manner, when the required power of the front motor 2 increases, switching to parallel mode is performed at an earlier timing than the first embodiment, as shown in FIG. 3. Hence, power supply to the front motor 2 can be more reliably ensured, and a temporary reduction of the driving force of the front wheels 4 can be more reliably prevented.

What is more, the higher the temperature $T_{cvtr}$ of the boost converter 18 and the lower the SOC of the drive battery, the earlier the switch timing to parallel mode becomes. As a result, since switching to parallel mode is performed earlier when the necessity of reducing passing power of the boost converter 18 with respect to the temperature Tcvtr and the SOC is greater, the passing power of the boost converter 18 is limited according to a lower maximum electric power, and thermal load can be reduced even more. Accordingly, the temperature of the boost converter 18 is lowered, the power limit value $W_{limit}$ increases promptly, and limitation imposed on power supply to the front motor 2 can be cancelled promptly.

Also, naturally, as in the case of the first embodiment, even if the motor generator 11 is activated after switching to parallel mode, power supply to the front motor 2 is maintained at the required power level. Hence, it is possible to prevent deterioration in drivability due to a temporary reduction in the driving force of the front wheels 4. Furthermore, although power supply to the front motor 2 is limited to the maximum electric power, at this point, the driving force of the engine 3 is added by switching to parallel mode. Hence, the driving force of the front wheels 4 transitions smoothly, and satisfactory drivability can be ensured.

Note that although the SOC correlation amount Wα2 is set on the basis of the SOC of the drive battery 20 in the second embodiment, any index may be used as long as it represents electric allowance of the drive battery 20. For example, instead of the SOC correlation amount Wα2, a larger voltage correlation amount Wα3 may be set for a lower voltage (remaining battery level) of the drive battery 20, and an allowance amount Wα may be calculated according to the following expression (4).

$$W\alpha = W\alpha 1 + W\alpha 3 \quad (4)$$

Although this is the end of the description of the embodiment, the form of the present invention is not limited to the embodiment. For example, although the above embodiments prevent deterioration in the driving force of the front wheels 4 caused by engine startup when switching from EV mode to parallel mode, the invention is not limited to this. For example, in a hybrid vehicle that can select, as a drive mode, engine mode where the vehicle travels by driving force of the engine alone, a similar reduction in driving force occurs when switching from EV mode to engine mode. Hence, measures similar to those of the above embodiments may be taken to prevent reduction in driving force, when switching between such drive modes.

The invention claimed is:

1. A controller of a hybrid vehicle, comprising:
a control unit configured to activate a drive motor or a starter for starting an engine by stepping up electric power from a battery by a voltage transformer, wherein:
the control unit includes a processor and a memory storing a program that causes the processor to:
limit passing power of the voltage transformer when the temperature of the voltage transformer rises, and
obtain a maximum electric power that can be supplied to the drive motor when the starter is activated, by subtracting a consumed power of the starter from limited power during limitation of passing power by the limiting step; and
the control unit activates the starter device to start the engine, when required power of the drive motor reaches the maximum electric power calculated by the obtaining step during limitation of passing power by the limiting step.

2. The controller of a hybrid vehicle according to claim 1, wherein
the obtaining step obtains the maximum electric power by subtracting the consumed power of the starter and a predetermined allowance amount from the limited power of the limiting step.

3. The controller of a hybrid vehicle according to claim 2, wherein the allowance amount is set larger for a higher temperature of the voltage transformer.

4. The controller of a hybrid vehicle according to claim 3, wherein the allowance amount is set larger for a lower remaining battery level of the battery.

5. The controller of a hybrid vehicle according to claim 2, wherein the allowance amount is set larger for a lower remaining battery level of the battery.

* * * * *